Sept. 25, 1928.

J. R. LITTY ET AL 1,685,425

SUBDIVIDING ATTACHMENT FOR MEASURING MACHINES

Filed March 19, 1927

Sept. 25, 1928.  
J. R. LITTY ET AL  
1,685,425

SUBDIVIDING ATTACHMENT FOR MEASURING MACHINES

Filed March 19, 1927  3 Sheets-Sheet 3

WITNESSES:

INVENTORS:
John R. Litty &
Trued B. Lundin,
BY
ATTORNEY.

Patented Sept. 25, 1928.

1,685,425

UNITED STATES PATENT OFFICE.

JOHN R. LITTY AND TRUED B. LUNDIN, OF PHILADELPHIA, PENNSYLVANIA.

SUBDIVIDING ATTACHMENT FOR MEASURING MACHINES.

Application filed March 19, 1927. Serial No. 176,672.

Our invention relates to measuring machines and more particularly to an attachment for sub-dividing a quantity of material which has been measured by a measuring machine, such as that described and claimed in our co-pending application, on even date herewith, Serial No. 176,671.

In using machines adapted to measure cake batter into quantities for certain sizes of cakes, it is sometimes advantageous to be able to divide such measured quantities into a plurality of smaller quantities for the making of small cakes, such as cup cakes and the like, and it is the object of our invention to provide an attachment for a measuring machine which will divide a measured quantity of material into a plurality of equal lots.

It also provides means for simultaneously delivering a plurality of measured quantities from the same machine for other purposes such as filling small containers with jams, jellies and the like. It is evident that production is considerably increased when a plurality of these small containers can be filled simultaneously.

In the handling and manufacture of food products, it is essential that all equipment used should be so designed that it may be readily cleaned and kept in a sanitary condition. A further object of our invention is to provide an attachment which is simple in construction and which may be readily cleaned.

Generally stated, the invention comprises an attachment for sub-dividing a measured quantity of material and includes a receptacle and a plurality of tubes or conduits leading therefrom, valve slides secured to the bottoms of several of the tubes, a valve in the slides actuated by an operative part of the measuring machine for simultaneously opening and closing the ends of all the tubes.

The drawings illustrate an embodiment of the invention and views therein are as follows.

Figure 2:
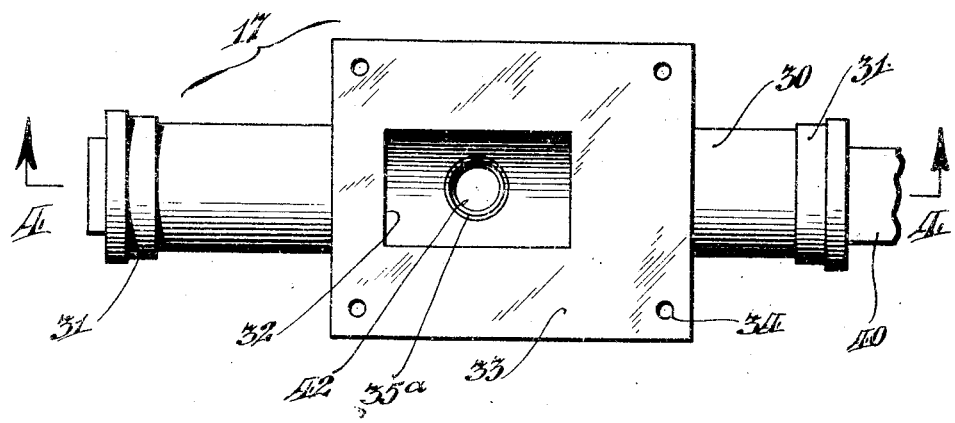
Figure 2 is a top plan view of an embodiment of our invention.
Figure 3:
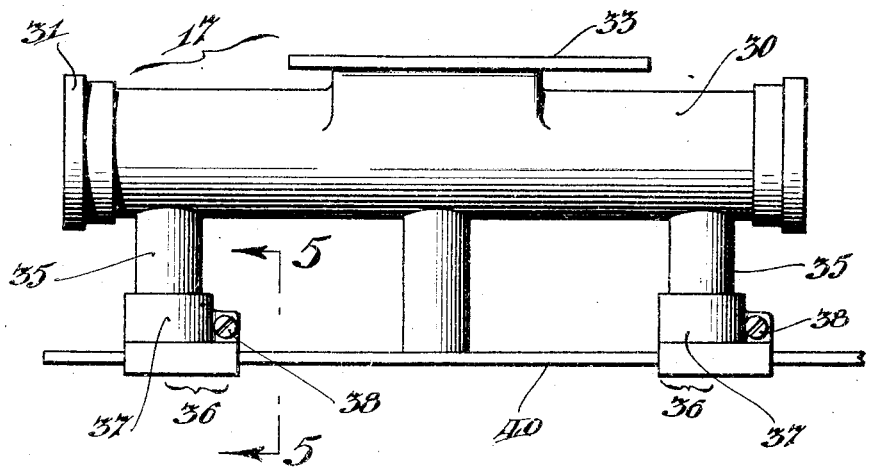
Figure 4:
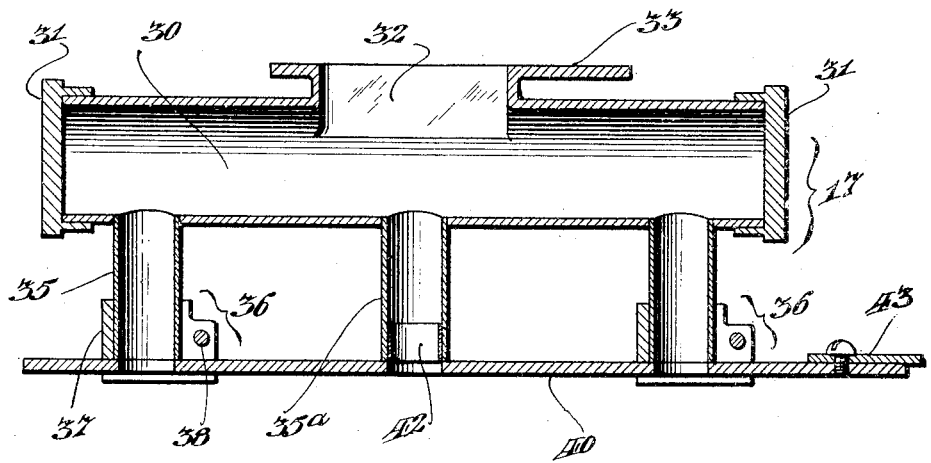
Figure 5:
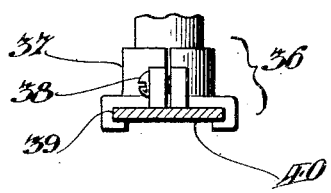

Figure 3 a side elevation thereof,

Figure 4 a longitudinal sectional view, taken on line 4—4 on Figure 2,

Figure 5 a fragmentary view taken substantially on line 5—5 on Figure 3, and

Figure 6:
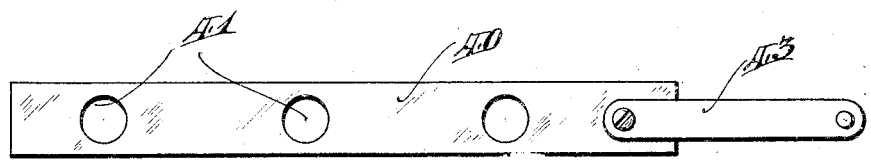

Figure 6 a plan view of a valve member forming a part of our invention.

Figure 1:
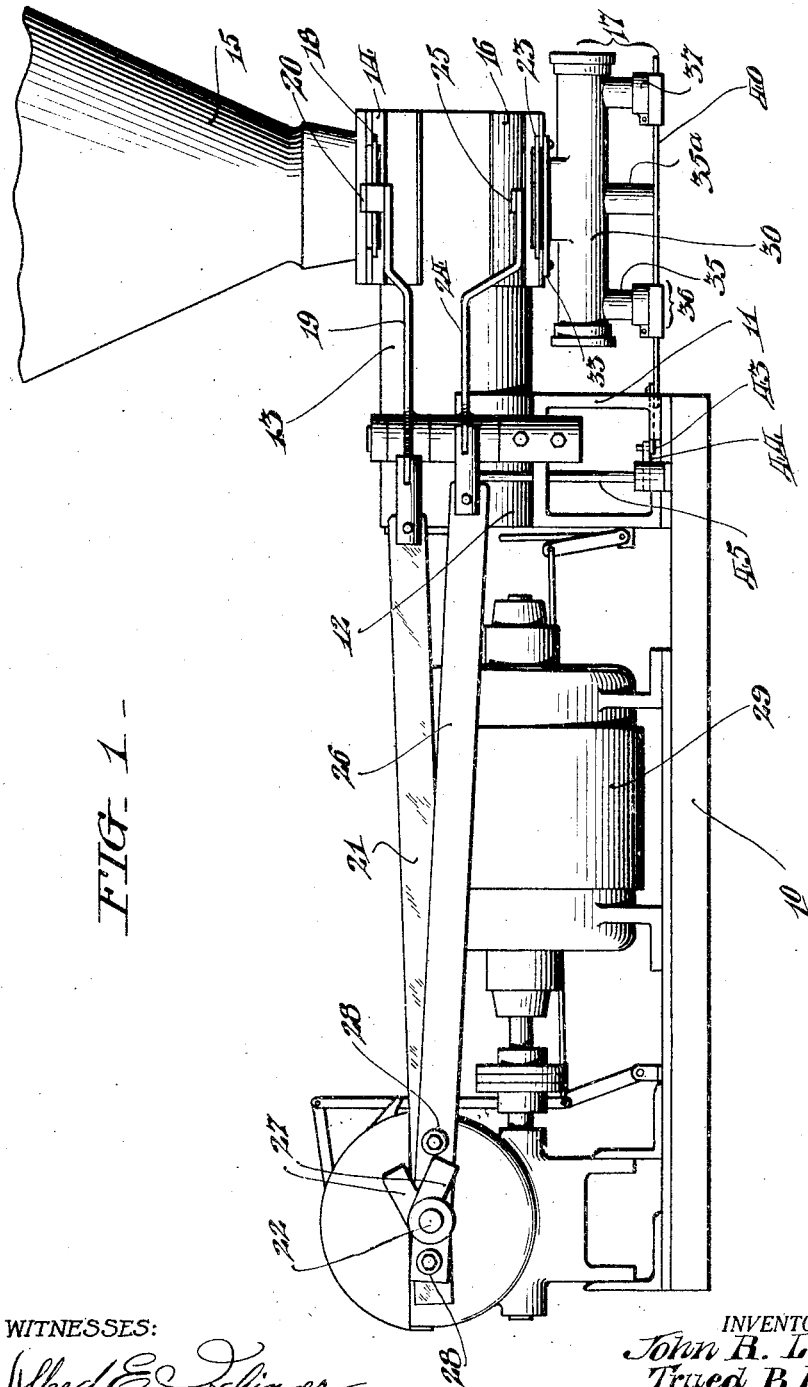
Figure 1 is a side elevation of a measuring machine, similar to that described and claimed in our co-pending application, to which an embodiment of our invention has been attached.

Referring now more particularly to Figure 1, the filling machine has a base 10 on one end of which is mounted a pedestal 11 having a cylinder support 12 fixed to its upper end and supporting a cylinder 13 which extends horizontally therefrom. On the upper side of the outer end of cylinder 13 is mounted a hopper support 14 to which a hopper 15 is detachably secured. On the under side of the outer end of cylinder 13, a valve casting 16 is rigidly secured and adapted to support an attachment 17 which embodies our invention and which will be more fully described hereinafter.

The hopper 15 communicates with the interior of cylinder 13 through a port formed in the hopper support 14. A valve slide 18 is slidably mounted in the hopper support 14 and connected to one arm of a bell crank 19 by means of a link 20. To the other arm of said bell crank is connected a connecting rod 21 which is provided with a slot in its other end through which a shaft 22 extends.

The material to be measured is adapted to pass out of the cylinder 13 through a port formed in the valve casting 16 which is adapted to be closed by a valve slide 23 slidable in said valve casting. The valve slide 23 is connected to one arm of a bell crank 24 by means of a link 25 and the other arm of the bell crank is connected to one end of a connecting rod 26. The other end of said rod is provided with a slot through which shaft 22 extends. Cams 27 are secured to shaft 22 and are adapted to engage rollers 28 on connecting rods 21 and 26 when shaft 22 is rotated by a motor 29 to which it is mechanically connected. As the cams 27 engage the rollers 28, it is evident that the connecting rods 21 and 26 will be drawn forwardly and rearwardly and actuate the bell cranks 19 and 24 and consequently cause the valve slides 18 and 23 to cover and uncover the ports leading to and from the interior of cylinder 13.

Referring now to all the views simultaneously, the attachment 17 consists of a body 30 which is tubular in cross section and which has its ends closed by caps 31. An opening 32 is formed in the upper side of the body 30 and surrounded by a flange 33 which is adapted to abut the bottom of the valve casting 16 and the opening 32 is adapted to align with the outlet from the cylinder 13; the attachment being held in place by bolts passed through holes 34 formed in the flange 33.

The under side of the body 30 is formed with a plurality of outlets in which tubes or conduits 35 are secured in any suitable manner, as by welding, or by forming the body 30 and said tubes integral. The lower ends of the outer tubes 35 are provided with valve slides 36 which may be clamped about the tubes by means of integral split collars 37 clamped into place by a screw 38. The under side of the valve slide 36 is machined to form a guideway 39 adapted to receive a slide valve 40 which is of uniform width throughout its length and provided with as many openings 41 as there are tubes 35, the openings 41 being of the same diameter and spacing as the tubes 35 so that all of the tubes may be either simultaneously opened or closed.

After the body 30 has been filled from the cylinder 13, as fully described in our co-pending application, above referred to, an additional measured quantity delivered by cylinder 13 will be emitted from attachment 17 in as many equal parts as there are tubes 35, and we have found that three is the most useful number to employ. As the center tube 35$^a$ is directly in line with the opening 32 and consequently receives a direct impulse from the cylinder 13, the material tends to flow more rapidly through this tube than through the other tubes. To overcome this difficulty, we provide a reduction ring 42 which may be inserted in the end of tube 35$^a$ and held therein by frictional contact. The thickness of ring 42 is dependent entirely upon the consistency of the material being measured and consequently a number of rings 42 of different thicknesses are furnished with each attachment. When the machine is used in the baking trade, the same ring will remain in tube 35$^a$ as bakers usually make batters of a uniform consistency.

As it is important that the slide valve 40 operate in unison with the slide valve 23 in order that material from the cylinder 13 may pass through attachment 17, we provide a link 43 having one end pivoted to the slide valve 40 and its other end adapted to be pivoted to a lever 44 fixed to a shaft 45 rotatable in base 10 and mechanically connected at its upper end to the bell crank 24 so that the movement of this bell crank causes the slide valves 23 and 40 to move in unison.

It is, of course, understood that the subdividing attachment illustrated may be modified in various ways without departing from the invention herein set forth and hereafter claimed.

We claim:

1. In combination with a measuring machine, a sub-dividing attachment including a receptacle having an inlet through which measured quantities of material are periodically received from the machine, a plurality of conduits communicating with the interior of the receptacle and forming outlets therefrom, and a valve member for closing the ends of the conduits.

2. An attachment for sub-dividing a measured quantity of material, including a receptacle, a plurality of conduits communicating with the interior of the receptacle and forming outlets therefrom; valve slides secured in the bottom of the outer conduits, and a valve in the slides for simultaneously opening and closing the ends of all the conduits.

3. An attachment for sub-dividing a measured quantity of material including a receptacle having an inlet, a plurality of conduits comunicating with the interior of the receptacle, a valve member slidably engaging the outer ends of the conduits for closing said ends, and a reduction ring in the conduit near the inlet and of such size as to prevent a greater amount of material from flowing therethrough than flows through any one of the other conduits.

4. An attachment for measuring machines including a receptacle having an inlet through which measured quantities of material are periodically received from the machine, conduits communicating with the interior of the receptacle, valve slides secured to the ends of certain of said conduits, a valve member slidable in the valve slides and engaging the ends of all of the conduits, means connecting the valve member to the machine for moving the valve member into open position when a measured quantity of material is being received from the measuring machine.

5. A sub-dividing attachment for a measuring machine comprising a receptacle, a plurality of conduits communicating with the interior of the receptacle and forming outlets therefrom, valve slides secured to the bottom of the conduits, and a valve adapted to operate in the slides for simultaneously opening and closing the ends of the conduits.

In testimony whereof we have signed our names to this specification.

JOHN R. LITTY.
TRUED B. LUNDIN.